United States Patent [19]

Kotani et al.

[11] Patent Number: 4,648,986

[45] Date of Patent: Mar. 10, 1987

[54] COMPOSITIONS BASED ON MIXTURES OF ETHYLENE-ETHYL ACRYLATE COPOLYMERS AND ETHYLENE-VINYL ACETATE-VINYL CHLORIDE TERPOLYMERS

[75] Inventors: Kunio Kotani; Akio Hayashi; Seiho Taniguchi, all of Yokohama, Japan

[73] Assignee: Union Carbide Corporation, Danbury, Conn.

[21] Appl. No.: 837,163

[22] Filed: Mar. 7, 1986

Related U.S. Application Data

[62] Division of Ser. No. 747,186, Jun. 21, 1985, Pat. No. 4,598,127.

[30] Foreign Application Priority Data

Sep. 5, 1984 [JP] Japan ................................ 59-184543

[51] Int. Cl.[4] .......................... H01B 1/06; C08K 3/04

[52] U.S. Cl. .................................... 252/511; 524/495; 524/496

[58] Field of Search ................. 252/511; 524/495, 496

[56] References Cited

U.S. PATENT DOCUMENTS

| | | | |
|---|---|---|---|
| 3,062,778 | 11/1962 | Cleve et al. | 525/229 |
| 3,382,198 | 5/1968 | Elslager | 525/229 |
| 4,299,736 | 11/1981 | Datta | 524/495 |
| 4,421,678 | 12/1983 | Mehta | 524/495 |

*Primary Examiner*—Jacob Ziegler

*Attorney, Agent, or Firm*—Saul R. Bresch

[57] ABSTRACT

Compositions based on mixtures of ethylene-ethyl acrylate copolymers and ethylene-vinyl acetate-vinyl chloride terpolymers which have adhesion to and strippability from crosslinked olefin polymers. Compositions of this invention, which are rendered semi-conductive by the addition of carbon black thereto, are especially useful as outer layers bonded to layers of crosslinked olefin polymer insulation of electrical conductors.

8 Claims, No Drawings

COMPOSITIONS BASED ON MIXTURES OF ETHYLENE-ETHYL ACRYLATE COPOLYMERS AND ETHYLENE-VINYL ACETATE-VINYL CHLORIDE TERPOLYMERS

This application is a division of prior U.S. application Ser. No. 747,186, Filing Date, June 21, 1985, now U.S. Pat. No. 4,598,127.

SUMMARY OF THE INVENTION

The present invention relates to compositions based on mixtures of ethylene-ethyl acrylate copolymers and ethylene-vinyl acetate-vinyl chloride terpolymers, to which can be added carbon black to provide improved semi-conductive compositions. The semi-conductive compositions of this invention are particularly useful as semi-conductive layers bonded to layers of crosslinked olefin polymer insulation of electrical conductors, for example, insulation of electrical power cables. The semi-conductive layers, formed from the compositions of this invention, adhere to layers of crosslinked olefin polymer insulation during normal use of the electrical conductors and, in addition, have controlled strippability that permits stripping from the insulation when necessary for the installation, repair or splicing of the electrical conductors.

BACKGROUND OF THE INVENTION

Insulated electrical conductors, i.e. insulated wires and cables, designed for medium to high voltage applications, are generally constructed of a metal core conductor having arranged coaxially around the core conductor, in the order named, an internal semi-conductive layer, a crosslinked olefin polymer insulation layer, an external semi-conductive layer, a metal shield layer and an outer protective sheath. Conventionally, the external semi-conductive layer is based on a composition containing an ethylene-ethyl acrylate copolymer or an ethylene-vinyl acetate copolymer, and carbon black. If it is desired to crosslink the external semi-conductive layer, an organic peroxide is added to the composition.

It is important, for the successful and rapid installation, repair or splicing of insulated electrical conductors that the external semi-conductive layer be strippable from the insulation layer. In order to provide compositions which have adequate adhesion, coupled with strippability, it has been proposed to chemically modify the polymers of the compositions and/or add various additives thereto. For example, it is known that the adhesion between the crosslinked olefin polymer insulation layer and the semi-conductive layer can be decreased by increasing the comonomer content, that is, the ethyl acrylate or vinyl acetate content of the ethylene-ethyl acrylate copolymers or of the ethylene-vinyl acetate copolymers, used in formulating compositions to be used as semi-conductive layers. It is also known that a desired level of strippability can be achieved by chlorinating the ethylene copolymers rather than by increasing the monomer content thereof.

As to additives, it is known that strippability of the semi-conductive layer from the crosslinked olefin polymer insulation layer can be improved by the addition of silicone oil, such as liquid dimethyl polysiloxane, to the composition of the semi-conductive layer.

These and other such measures, however, have not proved to be particularly effective. Compositions containing chlorinated ethylene copolymers exhibit inferior mechanical properties and poorer thermal stability when used as external semi-conductive layers of electrical power cables. Also, silicone oil is not completely compatible with ethylene copolymers and in time, oozes out of the compositions when used in amounts sufficient to improve strippability, generally in excess of 5 percent by weight. Furthermore, the addition of silicone oil, in amounts sufficient to improve strippability, degrades mechanical properties, particularly elongation, of the resultant compositions.

Stripping of the external semi-conductive layer from the crosslinked olefin polymer insulation layer has become a more pressing problem in view of more recent extrusion and "curing" techniques. According to recent extrusion technology, insulated electrical conductors are manufactured by coextrusion by which three layers, the internal semi-conductive layer, the crosslinked olefin polymer insulation layer and the external semi-conductive layer are extruded simultaneously, employing coaxial extruders, and subsequently cured in a single operation. In one aspect, this method of manufacture is advantageous in that it results in the close bonding of the three layers, eliminating partial delamination and void formation between layers, caused, during normal use, by flexure and heat. This, in turn, prevents corona deterioration and other insulation degradation. On the other hand, such a method of manufacture presents problems of strippability due to the high bond strength between the crosslinked olefin polymer insulation layer and the external semi-conductive layer, caused by formation of crosslinking bonds across their interface. Such high bond strength can extend time for repairs and, in some instances, can result in damage to the insulation layer during stripping operations.

As to the new "curing" technique, curing of crosslinkable layers is changing from the conventional "steam" cure to "dry" cure. "Dry" cure involves the use of an inert gas, such as nitrogen, heated to temperatures higher than temperatures attainable with steam. This new technique results in increased productivity of the insulated electrical conductors and eliminates the formation of microvoids in the insulation, which had been caused by diffusion of steam therethrough.

Although "dry" curing has eliminated the problem of microvoids and makes possible curing at higher temperatures, it has given rise to other problems of a serious nature. The semi-conductive, outer layers of the electrical conductors, which are directly exposed to the high temperatures of the dry cure process undergo thermal degradation, particularly in the case of layers of ethylene-vinyl acetate copolymers and ethylene-vinyl acetate-vinyl chloride terpolymers. Thermal degradation results in rapid deterioration of the properties of the insulated electrical conductors.

DETAILED DESCRIPTION OF THE INVENTION

The present invention provides compositions which, having an improved balance of properties, particularly adhesion and strippability, find use as semi-conductive layers bonded to layers of crosslinked olefin polymer insulation of electrical conductors. Semi-conductive layers, extruded from compositions of this invention, have sufficient adhesion to layers of crosslinked olefin polymer insulation, particularly polyethylene, to resist delamination during normal use of the electrical conductors and, in addition, have controlled strippability that permits the semi-conductive layers to be stripped from the insulation layers when necessary for the installation, repair or splicing of the electrical conductors.

In addition, the compositions of this invention are resistant to thermal degradation at temperatures on the order of about 250° C. to about 280° C., normally used in the dry cure process previously described.

The compositions of this invention comprise an ethylene-ethyl acrylate copolymer having a melt index, (ASTM D-1238) of 1 to 50 grams/10 minutes and containing about 30 to about 50 percent by weight combined ethyl acrylate, preferably about 30 to about 40 percent by weight combined ethyl acrylate; and an ethylene-vinyl acetate-vinyl chloride terpolymer containing about 30 to about 85 percent by weight combined ethylene, about 5 to about 60 percent by weight combined vinyl acetate and about 10 to about 70 percent by weight combined vinyl chloride.

If the combined ethyl acrylate content of the ethylene-vinyl acetate copolymer is less than about 30 percent by weight, the resultant composition does not have satisfactory stripping characteristics and/or undergoes undesirably high weight loss at elevated temperatures. Also, if the combined ethyl acrylate content is more than about 50 percent by weight, the resultant composition tends to melt stick.

In the case of the ethylene-vinyl acetate-vinyl chloride terpolymer, if the combined vinyl acetate content of the terpolymer is less than about 5 percent by weight, satisfactory stripping is not realized. If the vinyl acetate content is more than about 60 percent by weight, the resultant composition has poor heat stability.

Also, if the combined vinyl chloride content of the terpolymer is less than about 10 percent by weight, satisfactory stripping is not realized. If the combined vinyl chloride content is more than 70 percent by weight, adhesion to crosslinked polyethylene is not adequate.

Combined monomer content of the polymers is based on 100 percent total monomer content.

The amount of terpolymer relative to the amount of copolymer, to provide the compositions of this invention, is about 18 to about 330 parts by weight terpolymer per 100 parts by weight copolymer. If the terpolymer is present in an amount less than about 18 parts by weight per 100 parts by weight copolymer, strippability is destroyed. This is evidenced by the fact that test specimens, described in the Examples of the application, are broken before separation occurs. More than about 330 parts by weight terpolymer results in a semi-conductive composition, upon the addition of carbon black, that undergoes thermal degradation at temperatures on the order of about 250° C. to about 280° C. Furthermore, such a composition is characterized by poor tensile strength.

Preferably, the amount of terpolymer is present in an amount of about 18 to about 116 parts by weight per 100 parts by weight copolymer.

The phrase "having both adhesion and strippability" as used herein means that a force of about 0.3 kg/10 mm to about 4 kg/10 mm is required to strip the semi-conductive layer from the crosslinked polyethylene layer. A composition which can be stripped from the crosslinked polyethylene layer using a force of less than about 0.3 kg/10 mm is liable to separate during normal use. Requiring a force greater than about 4 kg/10 mm could result in damage to the polyethylene layer.

Among carbon blacks which can be added to the compositions of this invention for the purpose of rendering the compositions semi-conductive are furnace black, acetylene black, channel black, Ketjen black and the like. Highly conductive blacks such as Ketjen black EC are preferred as lesser amounts are necessary in order to make the compositions semi-conductive.

Carbon blacks are used in amounts at least sufficient to render the compositions semi-conductive.

As a rule, carbon blacks are used in amounts on the order of 40 to 100 parts by weight based on 100 parts by weight (combined weight) of the ethylene-ethyl acrylate copolymer and the ethylene-vinyl acetate-vinyl chloride terpolymer. The amount of carbon black may be decreased to 5 to 50 parts by weight when conductive carbon blacks having a high surface area such as Ketjen black EC are used. Ketjen black EC has a surface area of about 1000 $m^2/g$.

The compositions of this invention can be crosslinked by organic peroxides such as di-α-cumyl peroxide, 2,5-dimethyl-2,5-di(tertiary-butyl-peroxy)hexyne-3 and the like. Crosslinking improves the heat resistance of the semi-conductive compositions.

It is to be understood that the compositions can contain age resistors, processing aids, stabilizers, antioxidants, crosslinking boosters, fillers, pigments and the like, in amounts well known in the art.

Also, mixtures of materials noted can be used if so desired.

Semi-conductive compositions, the formulations of which are set forth in Table 1 were prepared by admixing, to a blend, 100 parts by weight of the semi-conductive compositions 4.0 parts by weight di-α-cumyl peroxide and one part by weight polymerized-1,2-dihydro-2,2,4-trimethyl quinoline, an antioxidant in a Brabender mixer.

Each composition was compression molded into sheets, 150 mm by 180 mm by 0.5 mm in thickness under the following molding cycle:

temperature—120° C.
pressure—85 $kg/cm^2$
time—10 minutes

Sheets, 150 mm by 180 mm by 20 mm in thickness were also molded, as described above, from a composition comprising polyethylene (density 0.929 g/ml, melt index 2), 2 percent by weight di-α-cumyl peroxide and 0.2 percent by weight polymerized-1,2-dihydro-2,2,4-trimethyl quinoline.

A sheet of the semi-conductive composition and a sheet of the polyethylene composition were placed, one on the other, and laminated together using a compression molder, under the following molding cycle:

temperature—180° C.
pressure—20 $kg/cm^2$
time—150 minutes

Test specimens, 10 mm by 120 mm, were punched from each sheet and the strippability thereof tested on a tensile testing machine. The two layers of each specimen were separated at a speed of 500 mm/min. at a temperature of 23° C., with the angle of the semi-conductive layer being 90° with respect to the crosslinked polyethylene layer. The force required to separate the two layers was regarded as the "stripping strength", in terms of kg/10 mm.

Weight loss of the compositions, which is an indication of heat stability, was determined using a Thermo Balance TGS-1 made by Perkin Elmer Co. Test pieces, each 2 mg. were heated to a temperature of 320° C. at a heating rate of 150° C. per minute in a nitrogen gas atmosphere. The temperatures of the test pieces were kept at 320° C. for one hour and the test pieces reweighed. Test results are set forth in Table 1.

TABLE 1

| | Semi-conductive resin composition (percent by weight) | | | | | | | |
|---|---|---|---|---|---|---|---|---|
| | E-EA* | | | | | | | |
| | EA content (wt. %) | incorporated amount (wt. %) | EA-VA-VC** incorporated amount (wt. %) | Carbon black type | Carbon black incorporated amount (wt. %) | Stripping strength (kg/10 mm) | Weight loss (%) | Elongation (percent) ASTM D-412 |
| Control 1 | 18 | 50 | 15 | Acetylene black | 35 | Broken**** | 8.2 | — |
| Control 2 | 18 | 30 | 35 | Acetylene black | 35 | " | 4.9 | — |
| Control 3 | 25 | 50 | 15 | Acetylene black | 35 | " | 11.4 | — |
| Control 4 | 25 | 30 | 35 | Acetylene black | 35 | 5.5 | 6.8 | — |
| Control 5*** | 35 VA% of EVA | 40 | 25 | Acetylene black | 35 | 0.6 | 20.0 | — |
| Control 6[1] | 55 | 40 | 25 | Acetylene black | 35 | 0.09 | 20.0[2] | 90 |
| Example 1 | 30 | 50 | 15 | Acetylene black | 35 | 2.9 | 12.8 | 200 |
| Example 2 | 30 | 30 | 35 | Acetylene black | 35 | 2.7 | — | 180 |
| Example 3 | 35 | 40 | 25 | Acetylene black | 35 | 1.8 | 13.5 | 180 |
| Example 4 | 40 | 40 | 25 | Acetylene black | 35 | 1.5 | 14.7 | 150 |
| Example 5 | 35 | 40 | 25 | Furnace black | 35 | 1.5 | — | 180 |
| Example 6 | 40 | 55 | 10 | Furnace black | 35 | 2.8 | — | 160 |

*Ethylene-ethyl acrylate copolymer
**Ethylene-vinyl acetate-vinyl chloride copolymer containing about 20 percent by weight combined vinyl acetate and 50 percent by weight combined vinyl chloride and remainder combined ethylene
***Ethylene-vinyl acetate copolymer
****Broken means that the specimen broke before separation occurred
[1]Pellets stuck
[2]Semi-conductive compositions having a percent weight loss of 20 percent or greater have poor heat stability and are unacceptable to cable manufacturers Melt index of ethylene-vinyl acetate copolymers of Table 1 is set forth below:

| | | melt index g/10 min. |
|---|---|---|
| Control | 1 | 20 |
| | 2 | 20 |
| | 3 | 20 |
| Example | 1 | 25 |
| | 2 | 25 |
| | 3 | 20 |
| | 4 | 22 |
| | 5 | 20 |
| | 6 | 22 |

It is to be noted that if the melt index of the ethylene-vinyl acetate copolymer is less than 1 gram/10 minutes, the melt viscosity becomes so high that extrusion onto the insulation layers becomes impossible. If the melt index is greater than 50 grams/10 minutes, tensile strength characteristics are poor.

What is claimed is:

1. A composition having adhesion to and strippability from crosslinked olefin polymers comprising an ethylene-ethyl acrylate copolymer having a melt index of 1 to 50 grams/10 minutes and containing about 30 to 50 percent by weight combined ethyl acrylate; an ethylene-vinyl acetate-vinyl chloride terpolymer containing about 30 to about 85 percent by weight ethylene, about 5 to about 60 percent by weight combined vinyl acetate, and about 10 to about 70 percent by weight combined vinyl chloride, wherein the amount of terpolymer is about 18 to about 330 parts by weight per 100 parts by weight copolymer; and carbon black in an amount sufficient to render said composition semiconductive.

2. A composition as defined in claim 1 wherein the carbon black is present in an amount of about 40 to about 100 parts by weight based on 100 parts by weight of copolymer and terpolymer.

3. A composition as defined in claim 1 wherein the carbon black is acetylene black.

4. A composition as defined in claim 1 wherein the carbon black is furnace black.

5. A composition as defined in claim 1 wherein the carbon black has a surface area of about 1000 $m^2$/gram.

6. A composition as defined in claim 1 containing an organic peroxide.

7. A composition as defined in claim 6 wherein the organic peroxide is di-alpha-cumyl peroxide.

8. The crosslinked product of the composition defined in claim 6.

* * * * *